United States Patent
Ersoy et al.

(10) Patent No.: US 6,435,052 B1
(45) Date of Patent: Aug. 20, 2002

(54) GEARSHIFT LEVER WITH LOCKING BAR

(75) Inventors: Mertin Ersoy, Walluf; Erich Klingenburg, Steinfeld; Joerg Rix, Quickborn, all of (DE)

(73) Assignee: ZF Lemförder Metallwaren AG (DE)

( * ) Notice: Subject to any disclaimer, the term of this patent is extended or adjusted under 35 U.S.C. 154(b) by 0 days.

(21) Appl. No.: 09/486,666

(22) PCT Filed: Jun. 30, 1999

(86) PCT No.: PCT/DE99/01889

§ 371 (c)(1),
(2), (4) Date: May 30, 2000

(87) PCT Pub. No.: WO00/01959

PCT Pub. Date: Jan. 13, 2000

(30) Foreign Application Priority Data

Jun. 30, 1998 (DE) .......................... 198 29 173

(51) Int. Cl.$^7$ .......................... F16H 63/38; F16D 57/00
(52) U.S. Cl. .......................... 74/473.1; 74/523
(58) Field of Search .......................... 74/503, 538, 543, 74/536, 473.23, 523, 473.21, 473.25, 473.26, 473.1, 535; 192/220.5

(56) References Cited

U.S. PATENT DOCUMENTS

| | | | | |
|---|---|---|---|---|
| 3,583,184 A | * | 6/1971 | Papale | 74/473.23 X |
| 4,565,151 A | * | 1/1986 | Buma | 74/473.23 X |
| 4,774,850 A | * | 10/1988 | Shovlin | 74/473.23 |
| 4,909,096 A | * | 3/1990 | Kobayashi | 74/538 |
| 4,986,143 A | * | 1/1991 | Livshits et al. | 74/473.21 X |
| 5,029,680 A | * | 7/1991 | Kobayshi et al. | 192/220.5 |
| 5,179,870 A | * | 1/1993 | Behrens et al. | 74/473.3 |
| 5,303,610 A | * | 4/1994 | Noel et al. | 74/535 |
| 5,309,783 A | * | 5/1994 | Doolittle et al. | 74/523 X |
| 5,617,760 A | * | 4/1997 | Woeste et al. | 74/473.23 |

FOREIGN PATENT DOCUMENTS

| | | | |
|---|---|---|---|
| DE | 2530784 | * | 1/1977 |
| DE | 43 42 460 | | 10/1995 |
| DE | 19513809 | * | 10/1996 |
| EP | 0 625 656 | | 11/1994 |

* cited by examiner

Primary Examiner—David A. Bucci
Assistant Examiner—Colby Hansen
(74) Attorney, Agent, or Firm—McGlew and Tuttle, P.C.

(57) ABSTRACT

A gearshift lever (1) for an automatic transmission in a motor vehicle is provided with a knob (4) arranged at the top end of the gearshift lever member. A locking bar (2) is guided axially on the gearshift lever. A manually movable mechanism (5, 7) actuates the locking bar (2) relative to the gearshift lever (1). Two parts of the mechanism (5, 7) have teeth (6, 8) engaging one another. These parts are arranged such that a movement of at least one of the parts (5) toward the locking bar (2) brings about an axial movement of the locking bar (2). At least one of the two toothed segments (6; 8) extends along a curve, and the effective power ratio through a first of two curve radii is greater than the power ratio of the second radius.

25 Claims, 2 Drawing Sheets

GEARSHIFT LEVER WITH LOCKING BAR

FIELD OF THE INVENTION

The present invention pertains to a gearshift lever for use with an automatic transmission in a motor vehicle and more particularly to a gearshift lever with a knob arranged at the top end of the gearshift lever, with a locking bar guided axially on the gearshift lever, and with a manually movable mechanism for actuating the locking bar relative to the gearshift lever.

BACKGROUND OF THE INVENTION

Gearshift levers with a locking bar, which is designed as a tie rod that is guided axially movably in a gearshift lever, so that the locking bar must be pulled by manually actuating the locking knob, are known. For example, DE 25 30 784 A1 discloses a shifting device, in which a button, which is arranged on the underside of the handle grip of the gearshift lever and is pivotably movable in the engaged position, is used as an actuating means, which engages an opening of the locking bar via a coupling element. By actuating the button, it is pivoted into the handle grip as a result of which the locking bar is raised via the coupling member in the hollow gearshift lever.

DE 43 42 460 A1 discloses a gearshift lever assembly unit, which has a tubular lever component, at the top end of which a grip part is provided, which has a control knob, which is arranged rotatably in a hollow space of the grip part. This control knob cooperates with a spring-loaded actuating bar, which pretensions the control knob in the upward direction. The control knob must be moved by a human operator in the axial direction against the spring force to the extent that a locking means will lock the control knob in a defined position. The gearshift operations of the transmission of the motor vehicle now become possible. The actuating rod is designed as a push bar in such a design.

Furthermore, a shifting device for a motor vehicle transmission, whose actuating rod is designed as a push rod, has been known from EP 0 625 656 A1. A knob, whose axial extension is provided with an oblique surface at the end, is located in the grip piece, which is arranged at the top end of a hollow gearshift lever. If the knob is moved in the axial direction into the grip piece, the end-side oblique surface acts against a complementary oblique surface at the top end of the actuating rod. The actuating rod is thus guided downward in the axial direction until a locking mechanism holds it in the desired position, so that the shifting operations on the transmission become possible.

Furthermore, DE 195 13 809 C1, which forms the preamble, discloses a gearshift lever, which has a knob arranged at the top end of the gearshift lever, a locking bar guided axially on the gearshift lever, and means moved manually for actuating the locking bar relative to the gearshift lever, in which two of the means have teeth engaging one another and these means are arranged such that the movement of one of the means closer to the locking bar causes an axial movement of the locking bar. One essential drawback of this state of the art is that the initial forces needed to actuate the locking bar are relatively high during the actuation of the locking bar, so that very strong forces have to be applied with the thumb at the beginning to actuate the shifting device. This creates the feeling of a jerky shifting, whose force curve is unphysiological. The manufacture of such a shifting device is also relatively expensive.

SUMMARY AND OBJECTS OF THE INVENTION

The object of the present invention is to propose another gearshift lever for an automatic transmission of a motor vehicle, which avoids the above-mentioned drawback of the state of the art and has an improved power ratio during the actuation of the locking device of the gearshift lever.

Correspondingly, the gearshift lever for an automatic transmission in a motor vehicle with a knob arranged at the top end of the gearshift lever, with a locking bar guided axially at the gearshift lever, and with manually movable means for actuating the locking bar relative to the gearshift lever, in which two of the means have teeth engaging one another and these means are arranged such that a movement of at least one of the means toward the locking bar causes an axial movement of the locking bar, is improved to ensure that at least one of the two toothed segments extends along a curve, wherein the effective power ratio through a first of two curve radii is greater than the power ratio of the second radius.

It is achieved with the gearshift lever according to the present invention that the forces needed to actuate the locking bar are weak at the beginning and assume a higher value during the further course of the movement.

In a variant, at least one of the toothed segments may extend on an elliptical section (quadrant of an ellipse). This causes the power ratio to decrease continuously.

According to a specific embodiment of the present invention, the means for actuating the locking bar have a pushbutton with teeth on the inside, i.e., on the side directed toward the locking bar, wherein the said pushbotton is movable at right angles to the axis of the locking bar. Furthermore, the means for moving the locking bar may have a toothed segment, which is pivotably connected to the locking bar at one end and has, at least at the other end, an elliptical segment with teeth, which teeth engage linearly extending teeth of the pushbutton and lead to a raising of the locking bar during a linear movement of the pushbutton. In interaction with the elliptical segment-like shape of the teeth of the toothed segment, which toothed segment is pivotably connected to the locking bar on one side, the teeth of the pushbutton, which are linear, on the one hand, cause an optimal curve of the force ratio between the linear movement of the pushbutton and the locking bar, which leads to a pleasant, freely moving actuation of the locking bar. The forces to be applied for the actuation of the pushbutton and consequently of the locking bar are very weak at the beginning because of the favorable power ratio and they continuously increase as the movement progresses. This leads to a biomechanically pleasant actuation of the locking device connected to the locking bar.

It is obvious that the above-mentioned features of the present invention, which will be explained later, can be used not only in the particular combination described, but also in other combinations or alone, without going beyond the scope of the present invention.

Other features and advantages of the present invention will appear from the following description of a preferred exemplary embodiment with reference to the drawings.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
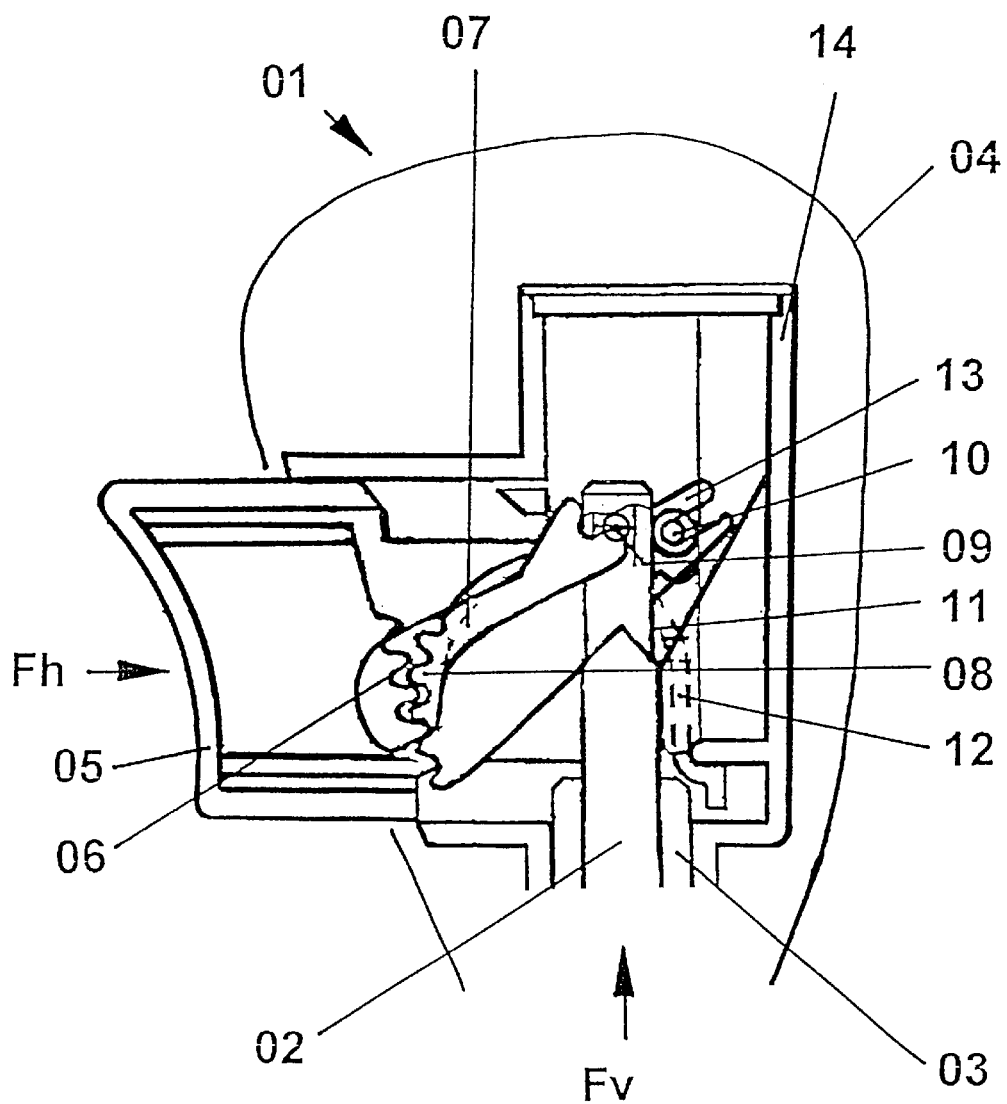
FIG. 1 is a partially sectional view showing a gearshift lever with a pushbutton in the resting position.
Figure 2:
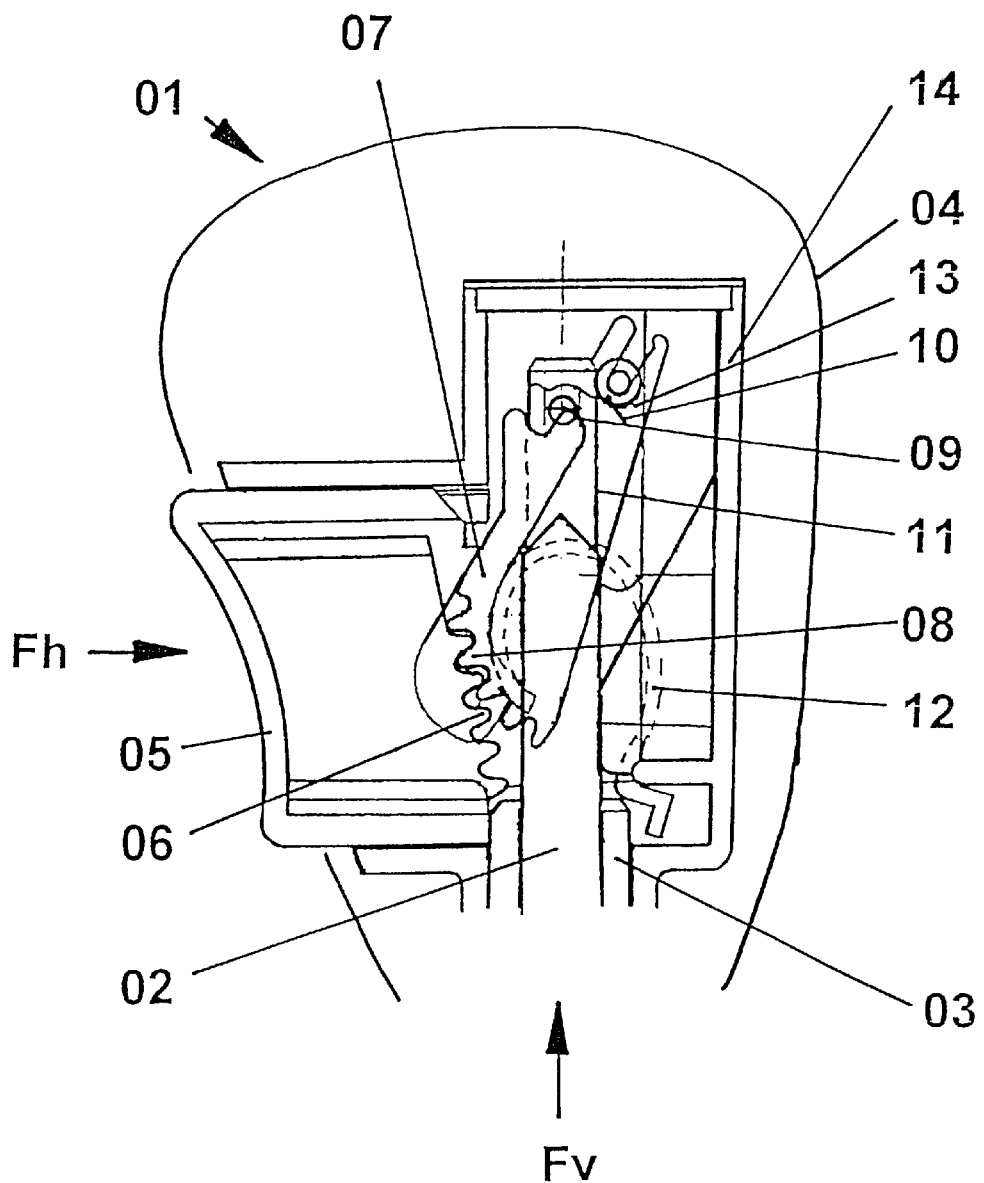
FIG. 2 is a partially sectional view showing a gearshift lever with pushbutton in the end position.

Referring to the drawings in particular, A pushbutton 5 is shown as the actuating element in the resting position in FIG. 1, while FIG. 2 shows the pushbutton 5 in its end position.

The gearshift lever 1 has a knob 4, in which a knob insert 14 having two openings directed at right angles to one another is embedded. The lower opening accommodates the guide 3 for the locking bar 2, while the upper opening, which stands at right angles thereto, accommodates the pushbutton 5, which can be displaced in it linearly. On its rear side, the pushbutton 5 has teeth 6, which extend linearly in the embodiment being shown. These teeth 6 of the pushbutton 5 are engaged by the teeth 8 of the elliptical toothed segment 7. The elliptical toothed segment 7 is pivotably connected at its right-hand end to the axially movable locking bar 2 via the pivot axis 9.

A roller 10, which is mounted axially in a roller bracket 13, is additionally provided in the knob insert on the opposite side of the pushbutton 5. The roller 10 supports the locking bar 2 against the force component of the pushbutton 5 acting at right angles to the axis of the locking bar.

Furthermore, a spring 12, which cooperates with the elliptical toothed segment 7 and is supported on the knob insert 14 on the right-hand side, is provided. This spring 12 is used, on the one hand, to hold the elliptical toothed segment 7 in its position during the assembly of the device while the pushbutton 5 is being inserted. On the other hand, the spring 12 also holds the elliptical toothed segment in its resting position and generates an elastic restoring force of the elliptical toothed segment toward the resting position. If the pushbutton 5 is moved linearly in the direction of the locking bar from its resting position, which is shown in FIG. 1, a leverage is generated via the elliptical toothed segment engaging the teeth, and this leverage acts on the locking bar 2 and it brings about an axial lifting movement of the locking bar 2 in the guide 3. The force component that does not extend axially and is transmitted by the pressure of the pushbutton 5 via the toothed segment 7 to the locking bar 2 is absorbed by the roller 10, so that the tie rod will perform only an axial movement. Due to the elliptical shape of the teeth on the toothed segment, different lever arms and consequently different ratios are obtained depending on the position of the pushbutton 5. At the beginning of the movement from the resting position, the power ratio (Fv/Fh), i.e., the ratio of the vertical force generated to the force acting horizontally, is greater in the resting position (FIG. 1) than in the end position (FIG. 2). The power ratio decreases continuously from the starting position to the end position in the case of the elliptical toothed segment used here.

It is thus achieved with this embodiment of a gearshift lever according to the present invention that the forces needed to actuate the pushbutton are favorable with respect to the biomechanics of the actuating hand and a pleasant force curve is obtained during the actuation of the locking bar.

While a specific embodiment of the invention has been shown and described in detail to illustrate the application of the principles of the invention, it will be understood that the invention may be embodied otherwise without departing from such principles.

What is claimed is:

1. A motor vehicle automatic transmission gearshift lever, comprising:
   a lever member;
   a knob arranged at the top end of said lever member;
   a locking bar guided axially with respect to said lever member;
   a manually movable mechanism for actuating the locking bar relative to said lever member, the mechanism including a first part with a toothed segment engaging a second part with a toothed segment arranged such that the movement of at least one part toward said locking bar brings about an axial movement of said locking bar and with at least one of said two toothed segments extending along a curve defining an effective power ratio through a first portion with a first curved radius which is greater than the power ratio of a second portion with a second radius.

2. A gearshift lever in accordance with claim 1, wherein one toothed segment extends linearly and the other toothed segment extends on an elliptical section.

3. A gearshift lever in accordance with claim 1, wherein said first part is a pushbutton with teeth on an inside surface, said pushbutton being movable at right angles to an axis of said locking bar.

4. A gearshift lever in accordance with claim 3, wherein said second part is pivotably connected at one end to said locking bar and has an elliptical segment with teeth at least at another end.

5. A gearshift lever in accordance with claim 1, wherein said movable mechanism and said locking bar define an effective lever arm, which brings about the axial movement of said locking bar, which is greater at the beginning of axial movement of said locking bar than at the end of the movement.

6. A gearshift lever in accordance with claim 5, wherein the effective lever arm decreases continuously with the movement of said locking bar.

7. A gearshift lever in accordance with claim 1, wherein an effective force for a linear approaching movement of said first part to actuate axial movement of said locking bar is lower at a beginning of the movement than at an end of the movement.

8. A gearshift lever in accordance with claim 7, wherein the force increases continuously with the movement of the locking bar.

9. A gearshift lever in accordance with claim 1, further comprising a guide receiving said locking bar.

10. A gearshift lever in accordance with claim 1, further comprising: a roller for absorbing forces acting at right angles to said locking bar.

11. A gearshift lever in accordance claim 1, wherein said movable mechanism includes a spring which generates a restoring force acting on said first part and said second part.

12. A gearshift lever in accordance with claim 1, wherein said movable mechanism includes a spring which holds one of said first part and said second part during assembly until the other of said first part and said second part is inserted.

13. A transmission gearshift lever, comprising:
    a lever member;
    a knob arranged at an end of said lever member;
    a locking bar guided axially with respect to said lever member;
    an actuating element movable by hand in said knob at right angles to said locking bar
    a pivot part pivotally connected to said locking bar, said actuating element and said pivot part having a shape and an engagement with each other to convert an actuating force on said actuating element into a bar force on said locking bar, said shape and engagement of said actuating element and said pivot part varying a ratio between said actuating force and said bar force.

14. A gearshift lever in accordance with claim 13, wherein one toothed segment extends linearly and the other toothed segment extends on an elliptical section.

15. A gearshift lever in accordance with claim 13, wherein said actuating element is a pushbutton with teeth on an inside surface, said pushbutton being movable at right angles to an axis of said locking bar.

16. A gearshift lever in accordance with claim 15, wherein said part is pivotably connected at one end to said locking bar and has an elliptical segment with teeth at least at another end.

17. A gearshift lever in accordance with claim 13, wherein said actuating element, said part and said locking bar define an effective lever arm, which brings about the axial movement of said locking bar, which is greater at the beginning of axial movement of said locking bar than at the end of the movement.

18. A gearshift lever in accordance with claim 17, wherein the effective lever arm decreases continuously with the movement of said locking bar.

19. A gearshift lever in accordance with claim 13, further comprising:
   a roller for absorbing forces acting at right angles to said locking;
   a spring which generates a restoring force acting on said actuating element and said part.

20. A gearshift lever in accordance with claims 13, further comprising a spring which holds one of said actuating element and said part during assembly until the other of said actuating element and said part is inserted.

21. A gearshift lever in accordance with claim 13, wherein:
   said actuating element is movable by hand between a first position and a second position;
   said shape and engagement of said actuating element and said pivot part cause an increase in required said actuating force for movement from said first position to said second position.

22. A gearshift lever in accordance with claim 13, wherein:
   said actuating element includes a toothed segment;
   said pivot part includes a toothed segment engaging said actuating element toothed segment, one of said pivot part toothed segment and said actuating element toothed segment extend along a curve with a varying curvature.

23. A gearshift lever in accordance with claim 22, wherein:
   said curve includes at least two different curved radii.

24. A gearshift lever in accordance with claim 13, wherein:
   said actuating element is movable by hand between a first position and a second position, said first position is spaced further from said lever member than said second position;
   a power ratio Fv/Fh) of said actuating force to said bar force is greater in said first position than in said second position.

25. A motor vehicle automatic transmission gearshift lever, comprising:
   a lever member;
   a knob arranged at the top end of said lever member;
   a locking bar guided axially with respect to said lever member;
   a manually movable mechanism for actuating the locking bar relative to said lever member, the mechanism including:
      an actuating element accommodated displaceably in said knob at right angles to the said locking bar, said actuating element being movable by hand to bring about an axial movement of the locking bar, said actuating element having a toothed segment;
      a pivot part connected at one end to said locking bar, said pivot part having a toothed segment engaging said actuating element toothed segment, at least one toothed segment extending along a curve and having either an elliptical section or a section defining an effective power ratio which is greater than the power ratio of the other toothed segment.

* * * * *